(12) United States Patent
Zhang et al.

(10) Patent No.: US 8,475,318 B2
(45) Date of Patent: Jul. 2, 2013

(54) PLANETARY GEAR TRANSMISSION MECHANISM

(75) Inventors: Guo-Qing Zhang, Shenzhen (CN); Xiao-Ming Xu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 778 days.

(21) Appl. No.: 12/628,395

(22) Filed: Dec. 1, 2009

(65) Prior Publication Data
US 2011/0053727 A1 Mar. 3, 2011

(30) Foreign Application Priority Data
Aug. 31, 2009 (CN) .......................... 2009 1 0306355

(51) Int. Cl.
*F16H 48/06* (2006.01)
(52) U.S. Cl.
USPC .......................................................... 475/230
(58) Field of Classification Search
USPC ........................................ 475/221, 230, 246
See application file for complete search history.

(56) References Cited

U.S. PATENT DOCUMENTS

| | | | | |
|---|---|---|---|---|
| 6,120,407 A | * | 9/2000 | Mimura | 475/225 |
| 7,121,972 B2 | * | 10/2006 | Allmandinger et al. | 475/230 |
| 7,238,140 B2 | * | 7/2007 | Gradu | 475/221 |
| 2004/0018909 A1 | * | 1/2004 | Hwa et al. | 475/221 |
| 2009/0145264 A1 | * | 6/2009 | Priepke | 74/84 R |

FOREIGN PATENT DOCUMENTS

| | | |
|---|---|---|
| CN | 2486782 Y | 4/2002 |
| CN | 101405523 A | 4/2009 |

\* cited by examiner

*Primary Examiner* — David D Le
*Assistant Examiner* — David J Hlavka
(74) *Attorney, Agent, or Firm* — Altis Law Group, Inc.

(57) ABSTRACT

A planetary gear transmission mechanism includes an input shaft, an input bevel gear connecting to the input shaft, four planetary bevel gears meshed with the input bevel gear, an output gear driven by the planetary bevel gears, a stationary bevel gear meshed with the planetary bevel gears, and four bearing modules. The output gear evenly defines four through holes along one axis. Each planetary bevel gear is received in one through hole and rotatably connected to the output gear. The rotation axis of each planetary bevel gear is substantially perpendicular to the rotation axis of the output gear. The stationary bevel gear meshes with the planetary bevel gears. The input bevel gear and the stationary bevel gear are positioned on opposite sides of the output gear respectively. The bearing modules are received in the through holes respectively, and each bearing module rotatably supports one planetary bevel gear.

5 Claims, 4 Drawing Sheets

PLANETARY GEAR TRANSMISSION MECHANISM

BACKGROUND

1. Technical Field

The present disclosure relates to gear transmission mechanisms and, more particularly, to a planetary gear transmission mechanism.

2. Description of Related Art

A commonly used planetary gear transmission mechanism generally includes a sun gear, a stationary gear, a plurality of planetary gears, and a planetary bracket connecting the sun gear and the planetary gears. The sun gear, the stationary gear, and the planetary gears are cylindrical gears. The stationary gear forms an inner gear ring. Each planetary gear meshes with both the sun gear and the inner gear ring of the fixing gear, such that each planetary gear can be rotated by the sun gear. Since the inner gear ring is stationary, each planetary gear not only rotates along its rotation axis but also along the rotation axis of the sun gear, thereby moving the planetary bracket. When two or more similar planetary gear transmission mechanisms are cascaded, a two-stage or multi-stage transmission system is achieved. The planetary gears are used to split the power of the planetary gear transmission mechanism, such that the load capacity of the planetary gear transmission mechanism is enhanced. However, the planetary gear transmission mechanism adopting cylindrical gears generally presents considerable radial size, and cannot be used in miniaturized applications, such as a pipeline maintenance robot. In addition, another commonly used planetary gear transmission mechanism adopting bevel gears presents the same axial size issues, plus reduced rigidity, thereby decreasing the stability of transmission.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
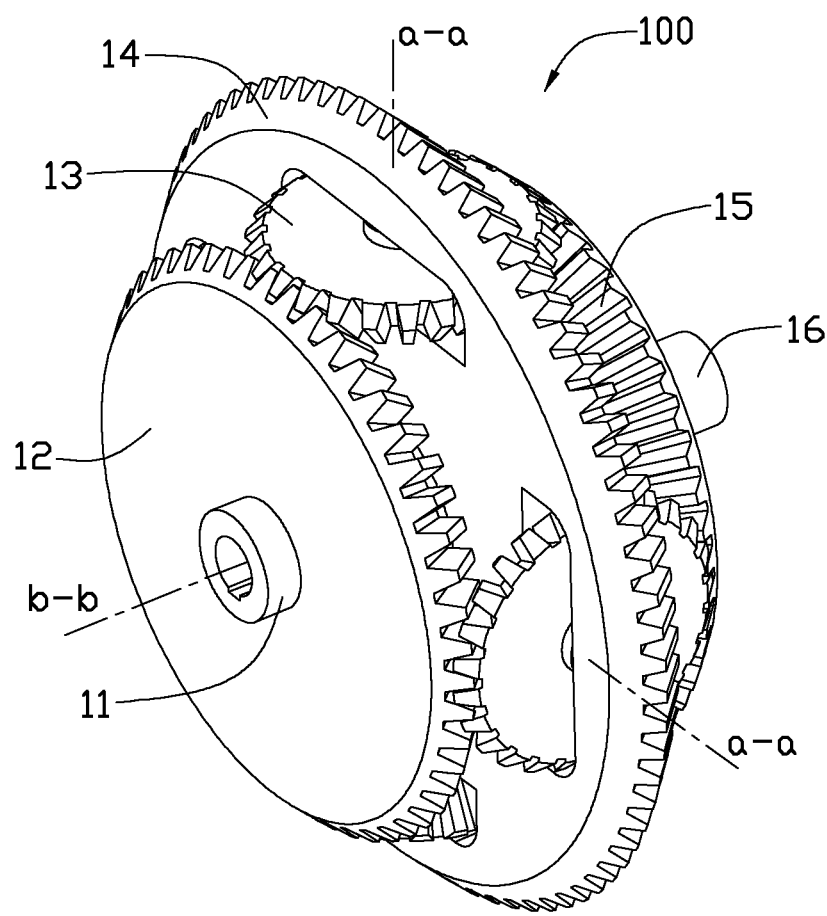
FIG. 1 is an assembled, isometric view of one embodiment of a planetary gear transmission mechanism, the planetary gear transmission mechanism including an output gear, four planetary bevel gears, and four bearing modules.

Referring to FIG. 1, one embodiment of a planetary gear transmission mechanism 100 includes an input shaft 11, an input bevel gear 12 connected to the input shaft 11, four planetary bevel gears 13 meshed with the input bevel gear 12, an output gear 14 driven by the planetary bevel gears 13, a stationary bevel gear 15 meshed with the planetary bevel gears 13, a support shaft 16 connecting the output gear 14 and the stationary bevel gear 15, and four bearing modules 17 rotatably supporting the four planetary bevel gears 13. The input bevel gear 12 and the stationary bevel gear 15 are positioned on opposite sides of the output gear 14.

Figure 2:
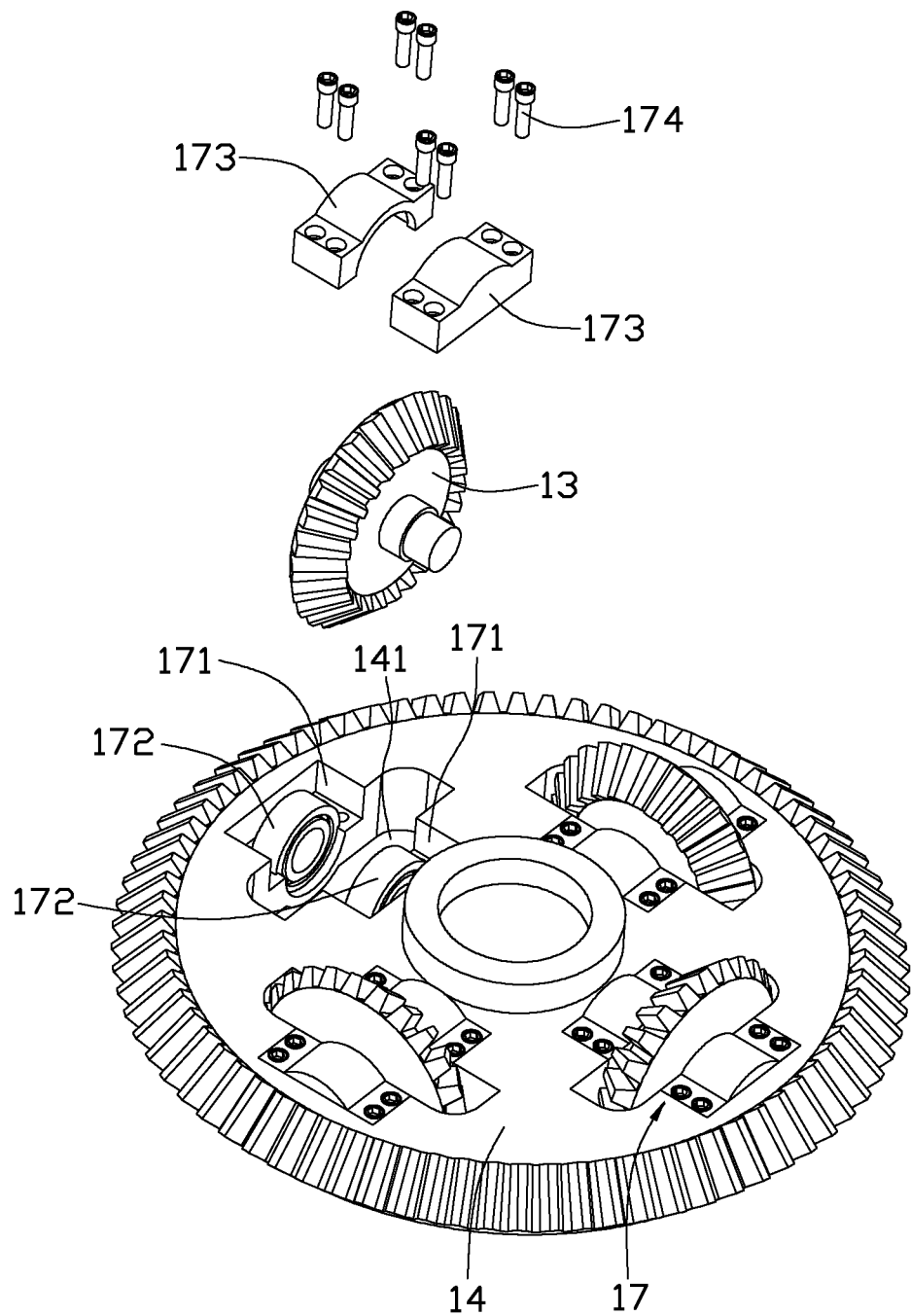
FIG. 2 is an isometric view of the output gear, the planetary bevel gears, and the bearing modules, showing one bevel gear and one corresponding bearing module detached from the output gear.

Referring also to FIG. 2, the output gear 14 defines four through holes 141 along a single axis. Each planetary bevel gear 13 passes through one through hole 141 and rotatably connects to the output gear 14. The rotation axis a-a of each planetary bevel gear 13 is substantially perpendicular to the rotation axis b-b of the output gear 14.

Each bearing module 17 is received in one through hole 141 of the output gear 14. Each bearing module 17 includes two bearing seats 171 positioned on opposite sides of the corresponding through hole 141, two bearings 172, two bearing covers 173 corresponding to the bearing seats 171, and a plurality of fasteners 174 for fixing the bearing covers to the bearing seats 171. Each bearing seat 171 and each bearing cover 173 cooperatively define a receiving space (not labeled) to receive one bearing 172. During assembly, the bearings 172 of each bearing module 17 are sleeved on two central axles (not labeled) extending from opposite sides of each planetary bevel gear 13. The bearings 172 are then received in the bearing seats 171, and the bearing covers 173 are positioned on the bearing seats 171 to cover the bearings 172. The bearing covers 173 are fixed to the corresponding bearing seats 171 by the fasteners 174.

The input bevel gear 12, the planetary bevel gears 13, the output gear 14, and the stationary bevel gear 15 cooperatively form a transmission system. The input gear 11 rotates the input bevel gear 12, which in turn rotates the planetary bevel gears 13. Since the stationary bevel gear 15 is stationary, each planetary gear 13 not only rotates along its rotation axis but also along the rotation axis of the input bevel gear 12 such that the planetary gears 13 rotate the output gear 14. Since the planetary gears 13 are received in the output gear 14, the radial and axial sizes of the planetary gear transmission mechanism 100 are small. The planetary gear transmission mechanism 10 is compact, and provides stable transmission and considerable rigidity.

In the illustrated embodiment, the planetary bevel gears 13 and the through holes 14 are evenly positioned in the output gear 14, such that the rotation axis of one bevel gear 13 is substantially perpendicular to the rotation axis of its adjacent bevel gears 13. The four planetary bevel gears 13 share the input power of the planetary gear transmission mechanism 100, thus the load capacity and transmission stability of the planetary gear transmission mechanism 100 are enhanced. The type of output gear 14 may be chosen according to actual requirement. In the illustrated embodiment, the output gear 14 is a bevel gear such that two or more similar planetary gear transmission mechanisms 100 can be cascaded to form a two-stage or multi-stage transmission system. The number of teeth of the input bevel gear 12 equals the number of teeth of the stationary bevel gear 15. It should be pointed out that the output gear 14 may be a cylindrical gear, thus the planetary gear transmission mechanism 100 may be cascaded with other kinds of transmission mechanisms.

The transmission characteristics of the planetary gear transmission mechanism 100 are as follows. The number of teeth of the input bevel gear 12, each planetary bevel gear 13, and the stationary bevel gear 15 are respectively $Z_1$, $Z_2$, $Z_3$; the angular velocity of the input bevel gear 12, the stationary bevel gear 15, and the output gear 14 are respectively $\omega_1$, $\omega_3$, $\omega_H$; a difference between the angular velocity of the input bevel gear 12 and the angular velocity of the output gear 14 is $\omega_1^H$; a difference between the angular velocity of the stationary bevel gear 15 and the angular velocity of the output gear 14 is $\omega_3^H$; the transmission ratio is $i_{13}^H$; with these parameters relating as follows:

$$i_{13}^H = \frac{\omega_1^H}{\omega_3^H} = \frac{\omega_1 - \omega_H}{\omega_3 - \omega_H} = \frac{\omega_1 - \omega_H}{0 - \omega_H} = -\frac{\omega_1}{\omega_H} + 1 = -\frac{Z_3 * Z_2}{Z_2 * Z_1} = -1 \quad (1)$$

The number of teeth of the input bevel gear 12 equals the number of teeth of the stationary bevel gear 15, that is $Z_1=Z_3$, according to the formula (1), $$\frac{\omega_1}{\omega_H} = 2$$

Accordingly, the speed reducing ratio of the planetary gear transmission mechanism 100 is 2. If an amount n of similar planetary gear transmission mechanisms are cascaded to form an n-stage transmission system, the total speed reducing ratio of such n-stage transmission system is $2^n$.

Figure 3:
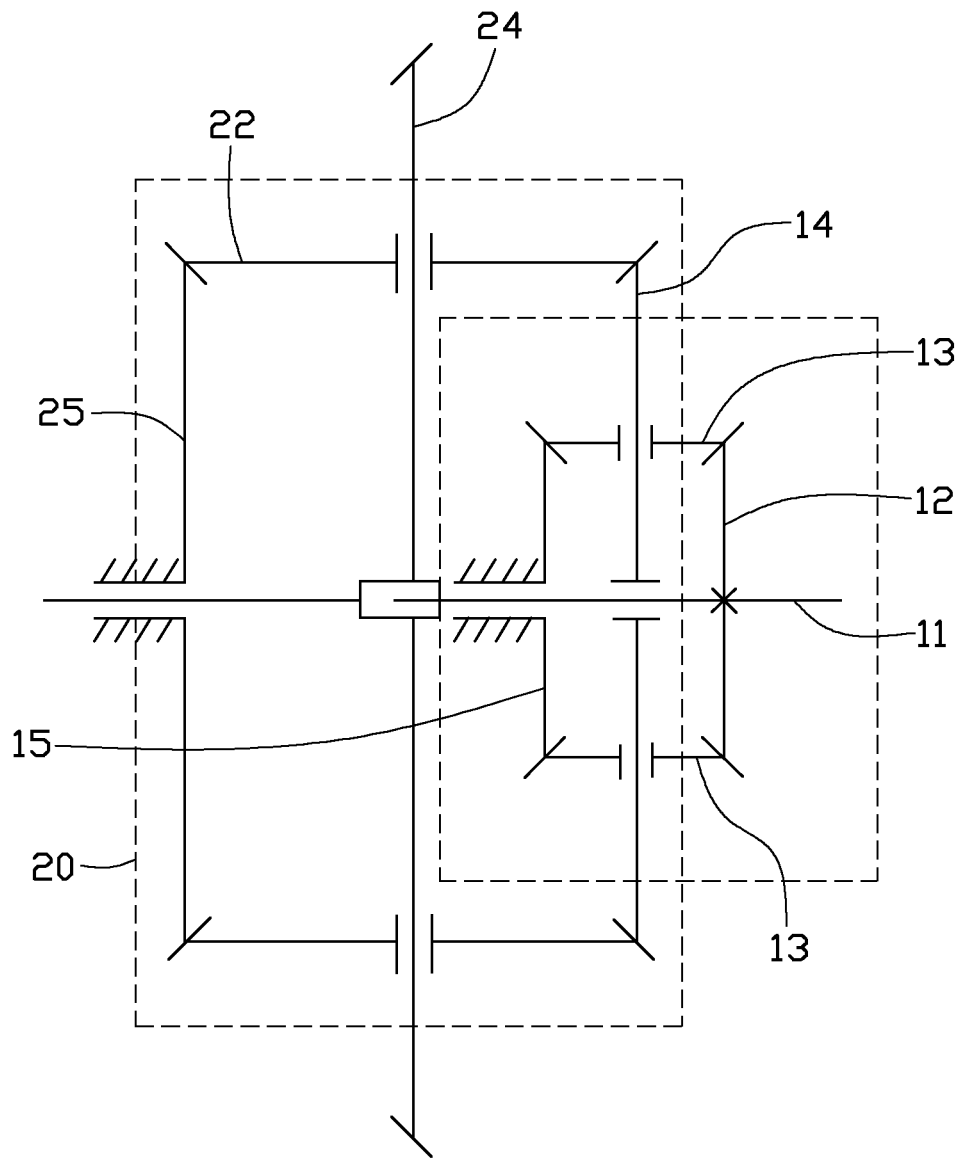
FIG. 3 is a plan view of a two-stage transmission system formed by cascading two similar planetary gear transmission mechanisms of FIG. 1.
Figure 4:
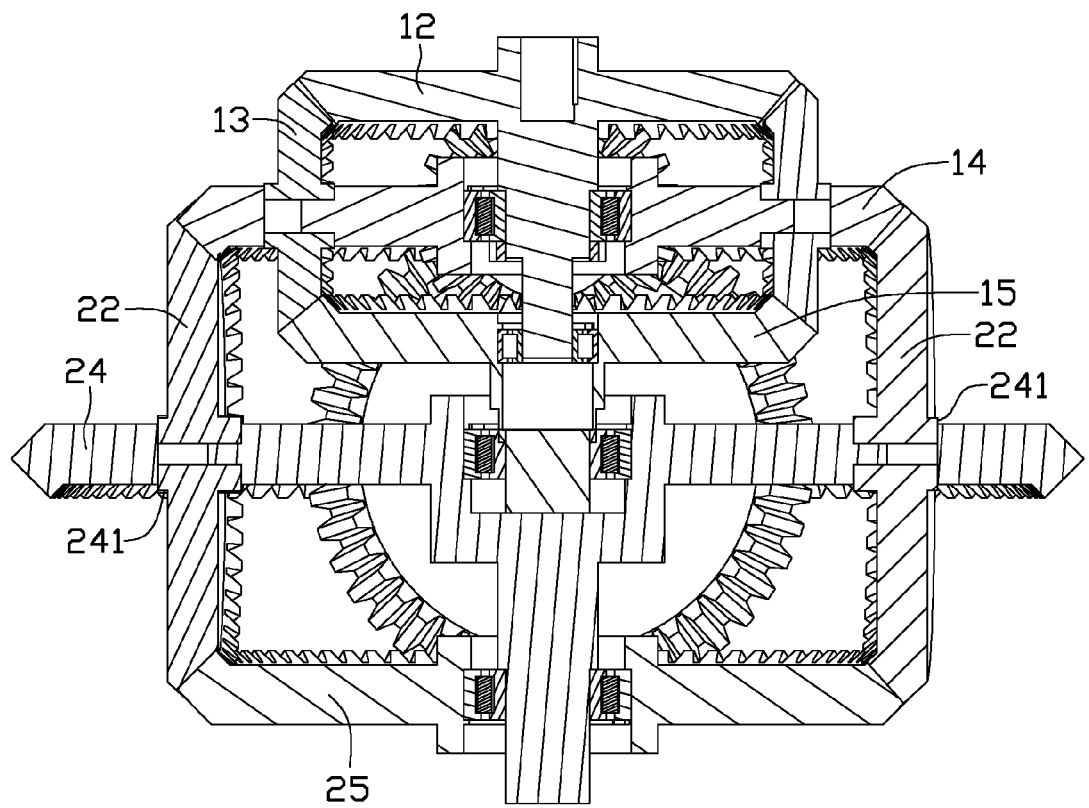
FIG. 4 is a cross section of the two-stage transmission system of FIG. 3.

Referring also to FIGS. 3 and 4, a two-stage transmission system (not labeled) includes the planetary gear transmission mechanism 100 and a second planetary gear transmission mechanism 20. The second planetary gear transmission mechanism 20 includes four planetary bevel gears 22 meshed with the output gear 14, an output gear 24 driven by the planetary bevel gears 22, and a stationary bevel gear 25 meshed with the planetary bevel gears 22. The output gear 24 is similar in principle to the output gear 14. The output gear 24 also defines four through holes 241 along one axis. Each planetary bevel gear 22 passes through one through hole 241 and rotatably connects to the output gear 24 correspondingly. The rotation axis of each planetary bevel gear 22 is substantially perpendicular to the rotation axis of the output gear 24. The radial and axial sizes of the two-stage transmission system are only slightly increased, thus the two-stage transmission system is still compact with stable transmission and favorable rigidity.

It should be pointed out that the number of the planetary bevel gears 13 is not limited to four, and may be one, two, three or even more than four, with the number of through holes 14 and bearing modules 17 corresponding thereto.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A planetary gear transmission mechanism, comprising:
   an input shaft;
   an input bevel gear connected to the input shaft;
   at least one planetary bevel gear meshed with the input bevel gear;
   two central axles extending from opposite sides of the at least one planetary bevel gear;
   an output gear driven by the at least one planetary bevel gear, wherein the output gear defines at least one through hole along one axis, the at least one planetary bevel gear being received in the at least one through hole and rotatably connected to the output gear, the rotation axis of the at least one planetary bevel gear is substantially perpendicular to the rotation axis of the output gear, the rotation axis of the output gear is coaxial with the rotation axis of the input bevel gear;
   a stationary bevel gear meshed with the at least one planetary bevel gear, wherein the input bevel gear and the stationary bevel gear are positioned on opposite sides of the output gear; and
   at least one bearing module received in the at least one through hole of the output gear, the at least one bearing module rotatably supporting the at least one planetary bevel gear, wherein the at least one bearing module comprises two bearing seats positioned on opposite sides of the corresponding through hole of the output gear, two bearings respectively sleeved on the central axles and received in the bearing seats, and two bearing covers positioned on the bearing seats to cover the bearings.

2. The planetary gear transmission mechanism of claim 1, wherein the output gear is a bevel gear, and the number of teeth of the input bevel gear equals the number of teeth of the stationary bevel gear.

3. A planetary gear transmission mechanism, comprising:
   an input shaft;
   an input bevel gear connected to the input shaft;
   four planetary bevel gears meshed with the input bevel gear;
   an output gear driven by the planetary bevel gears, wherein the output gear evenly defines four through holes along one axis, each planetary bevel gear being received in one through hole and rotatably connected to the output gear, the rotation axis of each planetary bevel gear is substantially perpendicular to the rotation axis of the output gear;
   a stationary bevel gear meshed with the planetary bevel gears, the input bevel gear and the stationary bevel gear positioned on opposite sides of the output gear respectively; and
   four bearing modules received in the through holes respectively, each bearing module rotatably supporting one planetary bevel gear.

4. The planetary gear transmission mechanism of claim 3, further comprising two central axles extending from opposite sides of each planetary bevel gear, wherein each bearing module comprises two bearing seats positioned on opposite sides of the corresponding through hole of the output gear, two bearings respectively sleeved on the central axles and received in the bearing seats, and two bearing covers positioned on the bearing seats to cover the bearings.

5. The planetary gear transmission mechanism of claim 1, wherein the output gear is a bevel gear, and the number of teeth of the input bevel gear equals the number of teeth of the stationary bevel gear.

* * * * *